United States Patent
Aliakseyeu et al.

(10) Patent No.: US 12,349,255 B2
(45) Date of Patent: Jul. 1, 2025

(54) CONTROLLING DIFFERENT GROUPS OF LIGHTING DEVICES USING DIFFERENT COMMUNICATION PROTOCOLS IN AN ENTERTAINMENT MODE

(71) Applicant: SIGNIFY HOLDING B.V., Eindhoven (NL)

(72) Inventors: Dzmitry Viktorovich Aliakseyeu, Eindhoven (NL); Niek Marcellus Cornelis Martinus Janssen, Eindhoven (NL); Leendert Teunis Rozendaal, Valkenswaard (NL); Walter Jeroen Slegers, Eindhoven (NL)

(73) Assignee: SIGNIFY HOLDING B.V, Eindhoven (NL)

( * ) Notice: Subject to any disclaimer, the term of this patent is extended or adjusted under 35 U.S.C. 154(b) by 246 days.

(21) Appl. No.: 17/924,168

(22) PCT Filed: May 11, 2021

(86) PCT No.: PCT/EP2021/062473
§ 371 (c)(1),
(2) Date: Nov. 9, 2022

(87) PCT Pub. No.: WO2021/233733
PCT Pub. Date: Nov. 25, 2021

(65) Prior Publication Data
US 2023/0180374 A1    Jun. 8, 2023

(30) Foreign Application Priority Data
May 19, 2020    (EP) .................... 20175335

(51) Int. Cl.
H05B 45/10        (2020.01)
H04L 41/0893      (2022.01)
(Continued)

(52) U.S. Cl.
CPC ....... *H05B 47/155* (2020.01); *H04L 41/0893* (2013.01); *H04L 67/12* (2013.01); *H05B 47/175* (2020.01)

(58) Field of Classification Search
CPC .................................................. H05B 47/155
See application file for complete search history.

(56) References Cited

U.S. PATENT DOCUMENTS

2013/0147395 A1    6/2013    Cook
2019/0036721 A1    1/2019    Pognant et al.
(Continued)

FOREIGN PATENT DOCUMENTS

WO    1989004578 A1    5/1989
WO    2018206378 A1    11/2018
(Continued)

*Primary Examiner* — Jared Fureman
*Assistant Examiner* — Esayas G Yeshaw (57) ABSTRACT

A system (11,21) is configured to identify a plurality of lighting devices (31-34) included in a entertainment group, assign a first subset (31,32) of the plurality of lighting devices to a first subgroup and a second subset (33,34) of the plurality of lighting devices to a second subgroup according to one or more grouping criteria, control, using a first communication protocol, the first subset of lighting devices to render a first subset of multiple dynamic light effects in the entertainment mode, and control, using a second communication protocol, the second subset of lighting devices to render a second subset of the multiple dynamic light effects in the entertainment mode. The first subset of lighting devices does not overlap completely with the second subset of lighting devices. At least one processor (15,25,85) of the system (11,21) is configured to determine distances between said system (11,21) and each of the plurality of lighting devices (31-34) and assign said plurality of lighting devices to said subgroups based on said distances.

14 Claims, 7 Drawing Sheets

(51) Int. Cl.
*H04L 67/12* (2022.01)
*H05B 47/155* (2020.01)
*H05B 47/175* (2020.01)

(56) References Cited

U.S. PATENT DOCUMENTS

| | | | |
|---|---|---|---|
| 2020/0029411 A1 | 1/2020 | Barna et al. | |
| 2021/0263600 A1* | 8/2021 | Starrett | G06F 3/04845 |
| 2021/0410254 A1* | 12/2021 | Aliakseyeu | H05B 45/20 |
| 2022/0124894 A1* | 4/2022 | Dyck | H05B 47/105 |
| 2022/0312558 A1* | 9/2022 | Broekman | H05B 47/175 |
| 2022/0390910 A1* | 12/2022 | Ferguson | G05B 15/02 |

FOREIGN PATENT DOCUMENTS

| | | |
|---|---|---|
| WO | 2018228883 A1 | 12/2018 |
| WO | 2021089475 A1 | 5/2021 |

\* cited by examiner

CONTROLLING DIFFERENT GROUPS OF LIGHTING DEVICES USING DIFFERENT COMMUNICATION PROTOCOLS IN AN ENTERTAINMENT MODE

CROSS-REFERENCE TO PRIOR APPLICATIONS

This application is the U.S. National Phase application under 35 U.S.C. § 371 of International Application No. PCT/EP2021/062473, filed on May 11, 2021, which claims the benefit of European Patent Application No. 20175335.7, filed on May 19, 2020. These applications are hereby incorporated by reference herein.

FIELD OF THE INVENTION

The invention relates to a system for controlling a plurality of lighting devices included in an entertainment group, said plurality of lighting devices being controlled, in an entertainment mode, to render dynamic light effects corresponding to audio and/or video content being rendered on a media rendering device.

The invention further relates to a method of controlling a plurality of lighting devices included in an entertainment group, said plurality of lighting devices being controlled, in an entertainment mode, to render dynamic light effects corresponding to audio and/or video content being rendered on a media rendering device.

The invention also relates to a computer program product enabling a computer system to perform such a method.

BACKGROUND OF THE INVENTION

Philips' Hue Entertainment and Hue Sync are gaining popularity. Philips Hue Sync enables the rendering of light effects based on the content that is played on a computer, e.g. video games. A dynamic lighting system can dramatically influence the experience and impression of audio-visual material, especially when the colors sent to the lights match what would be seen in the composed environment around the screen.

This new use of light can bring the atmosphere of a video game or movie right into the room with the user. For example, gamers can immerse themselves in the ambience of the gaming environment and enjoy the flashes of weapons fire or magic spells and sit in the glow of the force fields as if they were real. Hue Sync works by observing analysis areas of the video content and computing light output parameters that are rendered on Hue lights around the screen. When the entertainment mode is active, the selected lighting devices in a created entertainment group will play light effects in accordance with the content.

Recently, an HDMI module called the Hue Play HDMI Sync Box was added to the Hue entertainment portfolio. This new device addresses one of the main limitations of Hue Sync and aims at streaming and gaming devices connected to the TV. It will make use of the same principle of an entertainment group and the same mechanisms to transport information.

Currently, Hue entertainment supports up to ten addressable (Zigbee) light sources in an entertainment group. With the introduction of the HDMI module and the (upcoming) pixelated LED strip, this limitation might become a bottleneck. In Zigbee, a group of light sources can be controlled as a single light source and US 2019/036721 A1 discloses a similar principle. Although this allows more than ten light sources to be controlled in an entertainment mode, the light sources in the group are controlled to render the same light effect, which is often not desirable.

US2020029411A1 discloses a lighting system with client devices having a first type of radio and hub devices having a second type of radio.

US2013147395A1 discloses a dynamic ambient lighting system that extracts a lighting scheme from video data, parse the lighting scheme into individual lighting effects to control a light source.

SUMMARY OF THE INVENTION

It is a first object of the invention to provide a system, which can control a relatively large number of lighting devices to render individual dynamic light effects in an entertainment mode.

It is a second object of the invention to provide a method, which can be used to control a relatively large number of lighting devices to render individual dynamic light effects in an entertainment mode.

In a first aspect of the invention, a system for controlling a plurality of lighting devices included in an entertainment group, said plurality of lighting devices being controlled, in an entertainment mode, to render dynamic light effects corresponding to audio and/or video content being rendered on a media rendering device, comprises at least one input interface, at least one output interface, at least one processor configured to identify, via said at least one input interface, said plurality of lighting devices included in said entertainment group, assign a first subset of said plurality of lighting devices to a first group and a second subset of said plurality of lighting devices to a second group according to one or more grouping criteria, said first subset of lighting devices not overlapping completely with said second subset of lighting devices, control, via said at least one output interface, using a first communication protocol, said first group of lighting devices to render a first subset of said dynamic light effects in said entertainment mode, and control, via said at least one output interface, using a second communication protocol, said second group of lighting devices to render a second subset of said dynamic light effects in said entertainment mode.

By splitting the entertainment group into two (sub)groups where one group receives commands via one (e.g. RF) communication protocol (e.g. Bluetooth) and another via a second (e.g. RF) communication protocol (e.g. Zigbee), a larger number of lighting devices may be controlled to render individual dynamic light effects in the entertainment mode. Both groups may be controlled by the same system component or by different system components. For example, a bridge may control lighting devices using Zigbee and an HDMI module may control lighting devices using Bluetooth.

Typically, said first group and/or said second group has a maximum of lighting devices which can be assigned to said group. As a first example, Hue entertainment currently supports up to ten addressable Zigbee light sources in an entertainment group. Due to the constant stream of dynamic light effects in the entertainment mode, supporting more than ten Zigbee light sources, or more than ten groups of Zigbee lighting devices that behave the same, might cause performance issues. As a second example, the Bluetooth specifications specify that seven is the maximum number of Bluetooth devices that can be connected at the same time. In practice, devices normally use a lower maximum number of Bluetooth devices that can be connected at the same time.

When said first group can comprise at most a first quantity of said plurality of lighting devices and said first communication protocol and/or a frequency spectrum used by said first communication protocol is more suitable for communicating dynamic light effects than said second communication protocol and/or a frequency spectrum used by said second communication protocol, said at least one processor may be configured to assign said first quantity of said plurality of lighting devices to said first group. Said first communication protocol may be Bluetooth and said second communication protocol may be Zigbee, for example. Generally, Bluetooth is more suitable for communicating dynamic light effects and it may therefore be beneficial to assign as many lighting devices to the Bluetooth group as possible. This may be even more beneficial if the Zigbee channels are also used by one or more other devices, e.g. by a Wi-Fi access point.

The entertainment mode is a mode in which one more lighting devices, typically multiple lighting devices, are controlled to render dynamic light effects corresponding to audio and/or video content being rendered on a media rendering device. In order to let the system know which lighting devices to control in the entertainment mode, these lighting devices are included in an entertainment group. The first subset of lighting devices does not overlap completely with the second subset of lighting devices, but typically does not overlap at all with the second subset of lighting devices.

Said at least one processor may be configured to control either said first group of lighting devices or said second group of lighting devices via a bridge. Furthermore, said at least one processor may be configured to control said lighting devices from both said first and second groups via one of said communication protocols when said entertainment mode is not active.

Said at least one processor may be configured to determine distances between said system and each of said plurality of lighting devices and assign said plurality of lighting devices to said groups based on said distances. This is beneficial, for example, if the system comprises multiple components. For instance, said assignment may be performed such that said first subset comprises lighting devices nearer to a first component of said system than to a second component of said system and said second subset comprises lighting devices nearer to said second component of said system than to said first component of said system.

Alternatively, said assignment may be performed such that said first subset only comprises lighting devices of which a distance to at least one other lighting device of said first subset does not exceed a threshold and said second subset of lighting devices only comprises lighting devices of which a distance to any one of said lighting devices of said first subset exceeds said threshold. Lighting devices located next to each other are preferably assigned to one group to avoid visible mismatch in effects rendering.

Typically, one or more higher bandwidth communication protocols such as Wi-Fi are used by the system components to communicate with each other and one or more short-range RF communication protocols are used by the system components to communicate with the lighting devices. By reducing the use of short-range RF communication for communicating over a longer distance, network bandwidth can be used more optimally, and latency may be reduced.

Said at least one processor may be configured to determine said distances by determining a number of hops between said system and each of said plurality of lighting devices. By determining the distances as the number of hops, it becomes possible to minimize the number of hops. This is beneficial, as each hop typically requires more resources and increases latency.

Said first subset of lighting devices may comprise at least one lighting device which does not support said second communication protocol and/or said second subset of lighting devices may comprise at least one lighting device which does not support said first communication protocol. Typically, some lighting devices will support one of the communication protocols and other lighting devices will support both communication protocols. In this case, only one of the groups would be suitable for lighting devices that only support one of the communication protocols.

Said second subset of lighting devices may comprise two or more lighting devices which can be controlled with a single command. For example, when said second communication protocol is Zigbee, said second subset of lighting devices may comprise two or more lighting devices which have been assigned to a single Zigbee group. When lighting devices are regularly controlled with a single command and therefore regularly render the same light effect, these lighting devices are then preferably assigned to the same entertainment subgroup.

Said at least one processor may be configured to select at least one of said one or more grouping criteria from a set of grouping criteria based on a type of said audio and/or video content. For example, for dynamic content, it is often beneficial to render the dynamic light effects with low latency and or more grouping criteria that minimize latency may therefore be selected.

Said at least one processor may be configured to reassign, while said entertainment mode is active and according to said one or more grouping criteria, at least one of said first subset of lighting devices from said first group to said second group and/or at least one of said second subset of lighting devices from said second group to said first group. This is beneficial, for example, if said at least one processor is configured to determine differences between said dynamic light effects and assign said plurality of lighting devices to said groups based on said differences.

In a second aspect of the invention, a method of controlling a plurality of lighting devices included in an entertainment group, said plurality of lighting devices being controlled, in an entertainment mode, to render dynamic light effects corresponding to audio and/or video content being rendered on a media rendering device, comprises identifying said plurality of lighting devices included in said entertainment group, assigning a first subset of said plurality of lighting devices to a first group and a second subset of said plurality of lighting devices to a second group according to one or more grouping criteria, said first subset of lighting devices not overlapping completely with said second subset of lighting devices, controlling, using a first communication protocol, said first group of lighting devices to render a first subset of said dynamic light effects in said entertainment mode, and controlling, using a second communication protocol, said second group of lighting devices to render a second subset of said dynamic light effects in said entertainment mode. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a plurality of lighting devices included in an entertainment group, said plurality of lighting devices being controlled, in an entertainment mode, to render dynamic light effects corresponding to audio and/or video content being rendered on a media rendering device.

The executable operations comprise identifying said plurality of lighting devices included in said entertainment group, assigning a first subset of said plurality of lighting devices to a first group and a second subset of said plurality of lighting devices to a second group according to one or more grouping criteria, said first subset of lighting devices not overlapping completely with said second subset of lighting devices, controlling, using a first communication protocol, said first group of lighting devices to render a first subset of said dynamic light effects in said entertainment mode, and controlling, using a second communication protocol, said second group of lighting devices to render a second subset of said dynamic light effects in said entertainment mode.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a local computer, partly on the local computer, as a stand-alone software package, partly on the local computer and partly on a remote computer, or entirely on the remote computer or server. In the latter scenario, the remote computer may be connected to the local computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
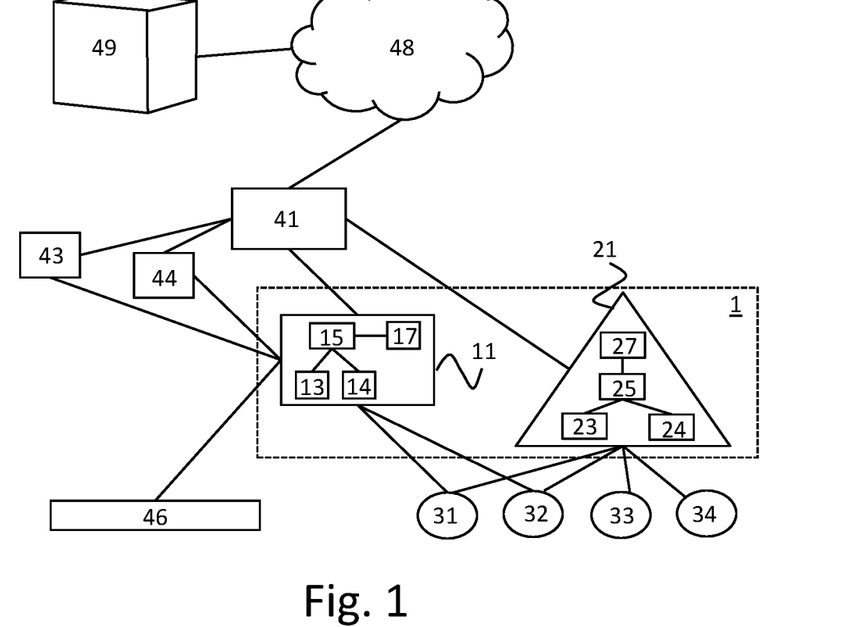
FIG. 1 is a block diagram of a first embodiment of the system.

FIG. 1 shows a first embodiment of the system for controlling a plurality of lighting devices included in an entertainment group: system 1. The plurality of lighting devices comprises lighting devices 31-34 and is controlled by the system 1, in an entertainment mode, to render dynamic light effects corresponding to audio and/or video content being rendered on a media rendering device, e.g. a TV. In the example of FIG. 1, the audio and/or video content is rendered on a media rendering device 46. Alternatively, the audio and/or video content may be rendered on multiple media rendering devices, e.g. a video wall.

In the embodiment of FIG. 1, system 1 comprises an HDMI module 11 and bridge 21. The HDMI module 11 may be a Hue Play HDMI Sync Box, for example. The bridge 21 may be a Hue bridge, for example. The HDMI module 11 can control the lighting devices 31-34 via the bridge 21 and can control lighting devices 31-32 directly, using a first communication protocol (e.g. Bluetooth). The bridge 21 communicates with the lighting devices 31-34 using a second communication protocol (e.g. Zigbee).

The bridge 21 may communicate with other lighting devices (not shown) that are not in the entertainment group. The bridge 21 may communicate with the lighting devices in the entertainment group. i.e. lighting devices 31-34, directly or via other (lighting) devices, e.g. using Zigbee. For lighting devices within single-hop distance from the bridge 21, unicast (without need for hopping) and interPAN communication may be used, for example. For devices further away, unicast communication (with hopping) may be used, for example. For all lighting devices, multicast/groupcast and broadcast communication may be used, for example.

The HDMI module 11 is connected to a wireless LAN access point 41, e.g. using Wi-Fi. The bridge 21 is also connected to the wireless LAN access point 41, e.g. using Wi-Fi or Ethernet. In the example of FIG. 1, the HDMI module 11 communicates to the bridge 21 via the wireless LAN access point 41, e.g. using Wi-Fi. Alternatively or additionally, the HDMI module 11 may be able to communicate directly with the bridge 21 e.g. using Zigbee, Bluetooth or Wi-Fi technology, and/or may be able to communicate with the bridge 21 via the Internet/cloud. The wireless LAN access point 41 is connected to the Internet 48. A media server 49 is also connected to the Internet 48. Media server 49 may be a server of a video-on-demand service such as Netflix, Amazon Prime Video, Hulu, Disney+ or Apple TV+, for example.

The HDMI module 11 is connected to the media rendering device 46 and local media receivers 43 and 44 via HDMI. The local media receivers 43 and 44 may comprise one or more streaming or content generation devices, e.g. an Apple TV, Microsoft Xbox One and/or Sony PlayStation 4, and/or one or more cable or satellite TV receivers. Each of the local media receivers 43 and 44 may be able to receive content from media server 49 and/or from a media server in the home network.

The HDMI module 11 comprises a receiver 13, a transmitter 14, a processor 15, and memory 17. The bridge 21 comprises a receiver 23, a transmitter 24, a processor 25, and memory 27. Processor 15 and/or processor 25 is/are configured to identify, via the receiver 13 and/or receiver 23, the plurality of lighting devices included in the entertainment group, i.e. lighting devices 31-34, and assign a first subset of the lighting devices 31-34, e.g. lighting devices 31 and 32, to a first group and a second subset of the lighting devices 31-34, e.g. lighting devices 33 and 34, to a second group according to one or more grouping criteria.

For example, during commissioning, the bridge 21 might inform the HDMI module 11 of lighting device properties that are important for the grouping and the processor 15 of the HDMI module 11 may assign the lighting devices to the (sub)groups. The first subset of lighting devices does not overlap completely with the second subset of lighting devices. In an alternative embodiment, the assignment of lighting devices to groups is performed elsewhere, e.g. in an app or in the cloud.

In the example of FIG. 1, lighting devices 33 and 34 do not support the first communication protocol and are therefore assigned to the second group. Lighting devices 31 and 32 could each be assigned to either the first group or the second group. If the first communication protocol is Bluetooth, the second communication protocol is Zigbee, and multiple of lighting devices 31-34 have been assigned to a single Zigbee group, these multiple lighting devices are preferably assigned to the second group. For example, if lighting devices 32 and 33 are assigned to a single Zigbee group, lighting devices 32-34 may be assigned to the second group.

The processor 15 is configured to control, via the transmitter 14, using the first communication protocol, the first group of lighting devices to render a first subset of the dynamic light effects in the entertainment mode. The processors 15 and 25 are configured to control, via the transmitters 14 and 24, using the second communication protocol, the second group of lighting devices to render a second subset of the dynamic light effects in the entertainment mode. Thus, the second group of lighting devices is controlled via the bridge 21.

For example, the processor 15 of the HDMI module 11 may transmit color values for the lighting devices controlled via the second communication protocol (e.g. Zigbee) and a list of lighting devices that will be directly controlled by the HDMI module 11 (using the first communication protocol) to the bridge 21. The HDMI module 11 then transmits color values for the lighting devices controlled via the first communication protocol (e.g. Bluetooth) to these latter lighting devices itself.

One or more of the following grouping criteria may be used:

Distance between system components and lighting devices. For example, in the case of Zigbee, whether the lighting device is directly reachable or requires hopping via another Zigbee device may be considered. If, due to the distance between a system component and a lighting device, the expected amount of dropped commands exceeds a threshold such that the large distance becomes noticeable to the user, another system component/group may be preferable. The lighting devices may be grouped based on how close they are to the bridge 21 and the HDMI module 11.

Capability of the lighting devices. For example, whether a lighting device is capable of Bluetooth communication or not may be taken into account. Furthermore, if a pixelated light strip is modelled as multiple lighting devices, all of those lighting devices are preferably assigned to a single group and not split between the two groups (for transmission efficiency and synchronicity of effects). Some lighting devices may be capable of "richer" light effects which can only be triggered via Bluetooth, but not via Zigbee, and are therefore preferably assigned to the Bluetooth group. If lighting devices are Bluetooth (e.g. BLE) capable but too far from HDMI module 11 to be reached, these lighting devices may need to be controlled using Zigbee via the bridge 21.

Relative location of the lighting devices. If one communication protocol is faster (i.e. its communication and processing steps have a lower overall latency) than the other communication protocol, lighting devices that are expected to render faster light effects (e.g. lighting devices close to the TV screen) could be assigned to the group with the faster communication protocol. Moreover, if the system would not be able to synchronize rendering of light effects transmitted using two different communication protocols (e.g. Zigbee and Bluetooth), then lighting devices located next to each other (or perceived as next to each other from the user's viewpoint) are preferably assigned to one group to avoid visible mismatch in effects rendering.

Interference or usage of the network in different parts of the space where the lighting devices are located.

The processor 25 is configured to control the lighting devices of both the first and second subsets, i.e. lighting devices 31-34, via the second communication protocol when the entertainment mode is not active. In an alternative embodiment, the bridge 25 may be able to control some of the lighting devices via the HDMI module 11, even when then the entertainment mode is not active.

The assignment to one group or another group may be dynamic, and change based on the light effects that are being rendered and required synchronization (i.e. how in sync the light effects on individual lighting devices should be). Lighting devices that need to have a synchronous relation are preferably included in the same group. If one of the groups uses a communication protocol that has a lower latency than the other, that group may be used to render 'fast' effects like explosions, and the other group may be used for less time-critical effects.

When the second communication protocol is a default or preferred protocol, e.g. Zigbee for Hue systems, the lighting devices that have been assigned to the group that uses the first communication protocol (e.g. Bluetooth) may still be informed via the second communication protocol that they have been assigned to the first group. Alternatively or additionally, triggers may be transmitted to these lighting devices using the second communication protocol for synchronous light effects activation and/or credentials may be transmitted to these lighting devices using the second communication protocol that allow them to render the dynamic light effects transmitted using the first communication protocol, e.g. in case the second communication protocol is more secure.

In the embodiment of FIG. 1, the bridge 21 only supports the second communication protocol (e.g. Zigbee). In an alternative embodiment, the bridge 21 also supports the first communication protocol (e.g. Bluetooth). In this alternative embodiment, it may be possible to create three groups: a group with one or more lighting devices controlled using the first communication protocol by bridge 21, a group with one or more lighting devices controlled using the second communication protocol by bridge 21, and a group with one or more lighting devices controlled using the first communication protocol by HDMI module 11.

In the embodiment of the HDMI module 11 shown in FIG. 1, the HDMI module 11 comprises one processor 15. In an alternative embodiment, the HDMI module 11 comprises multiple processors. The processor 15 of the HDMI module 11 may be a general-purpose processor, e.g. ARM-based, or an application-specific processor. The processor 15 of the HDMI module 11 may run a Unix-based operating system for example. The memory 17 may comprise one or more memory units. The memory 17 may comprise solid-state memory, for example.

The receiver 13 and the transmitter 14 may use one or more wired or wireless communication technologies such as Wi-Fi to communicate with the wireless LAN access point 41 and HDMI to communicate with the media rendering device 46 and with local media receivers 43 and 44, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 13 and the transmitter 14 are combined into a transceiver. The HDMI module 11 may comprise other components typical for a consumer electronic device such as a power connector. The invention may be implemented using a computer program running on one or more processors.

In the embodiment of the bridge 21 shown in FIG. 1, the bridge 21 comprises one processor 25. In an alternative embodiment, the bridge 21 comprises multiple processors. The processor 25 of the bridge 21 may be a general-purpose processor, e.g. ARM-based, or an application-specific processor. The processor 25 of the bridge 21 may run a Unix-based operating system for example. The memory 27 may comprise one or more memory units. The memory 27 may comprise one or more hard disks and/or solid-state memory, for example. The memory 27 may be used to store a table of connected lights, for example.

The receiver 23 and the transmitter 24 may use one or more wired or wireless communication technologies such as Zigbee to communicate with the lighting devices 31-34 and Ethernet to communicate with the wireless LAN access point 41, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 23 and the transmitter 24 are combined into a transceiver. The bridge 21 may comprise other components typical for a network device such as a power connector. The invention may be implemented using a computer program running on one or more processors.

In the embodiment of FIG. 1, the system of the invention comprises an HDMI module and a bridge. In an alternative embodiment, the system may comprise another type of device, e.g. a mobile device or a local media receiver (e.g. Apple TV or Amazon Fire TV media player) instead of or in addition to the HDMI module. If the system is a mobile device, the system may communicate with the media rendering device 46 via an HDMI, MHL or wireless connection, for example. In the embodiment of FIG. 1, the system of the invention comprises multiple devices. In an alternative embodiment, the system comprises a single device.

In the embodiment of FIG. 1, the system of the invention comprises only local devices. In an alternative embodiment, the system of the invention comprises one or more Internet/cloud servers. For example, if the light effects are determined from a light script, all processing, including the assignment of lighting devices to groups, may be performed in the cloud and light commands may then be streamed to lighting devices by the Internet/cloud server, e.g. via one or more intermediate devices like a bridge, local media receiver (e.g. Apple TV or Amazon Fire TV media player), HDMI module, Internet router, or smart speaker (that can, for example, communicate with lighting devices via Bluetooth).

If light commands are streamed via multiple intermediate devices, they may not even be aware of each other's role in the light effect rendering, because the cloud system could connect to these two devices separately and stream two separate sets of light commands: one for one intermediate device (that uses the first communication protocol to communicate with lighting devices) and one for the other intermediate device (that uses the second communication protocol to communicate with lighting devices).

Figure 2:
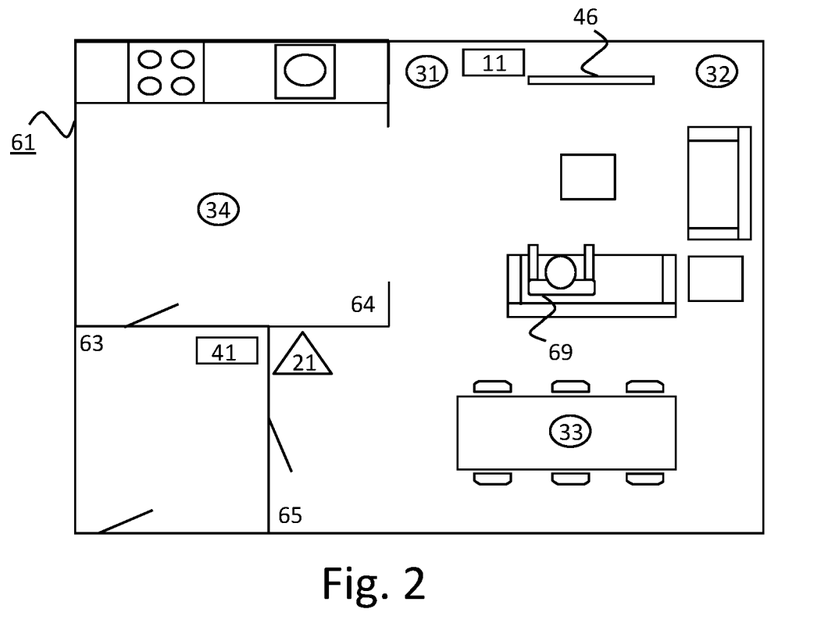
FIG. 2 depicts an example of a space in which the system of FIG. 1 is used.

FIG. 2 depicts an example of a space in which the system of FIG. 1 is used. A floor 61 of a home comprises a hallway 63, a kitchen 64 and a living room 65. Lighting devices 31-33 have been installed in the living room 65 and lighting device 34 has been installed in the (open) kitchen 64. Lighting device 33 has been installed above a dining table. Lighting devices 31 and 32 have been installed on respectively the left and right side of the media rendering device 46, which may be a TV, for example.

The wireless LAN access point 41 has been installed in the hallway 63. The HDMI module 11 has been installed next to the media rendering device 46 in the living room 65. The bridge 21 has been installed in the living room 65 near the wireless LAN access point 41. A person 69 is watching TV. Lighting devices 31-34 are part of the entertainment group and are controlled to render light effects that correspond to the audio and/or video content displayed on the media rendering device 46. Lighting devices 31 and 32 are in direct view of the person 69. Although lighting devices 33 and 34 are not in direct view of the person 69, the person 69 can see at least part of the light effects rendered by the lighting devices 33 and 34.

Figure 3:
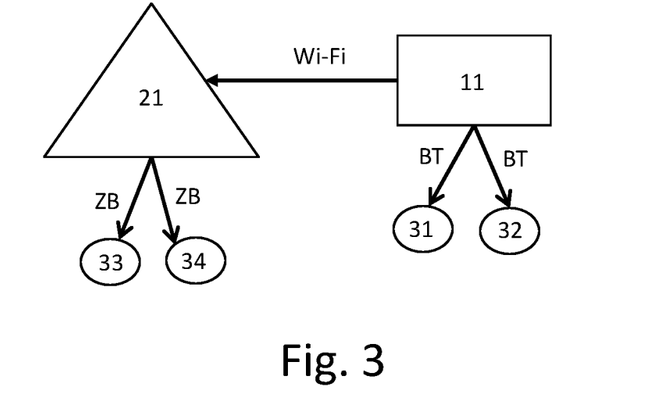
FIG. 3 shows an example of connections established in an entertainment mode.

FIG. 3 shows an example of connections established in an entertainment mode. In this example, the HDMI module 11 controls lighting devices 31 and 32 directly using Bluetooth and controls lighting devices 33 and 34 via the bridge 21. To control lighting devices 33 and 34, the HDMI module 11 transmits commands to the bridge 21 using Wi-Fi. The bridge 21 then transmits, based on these commands, further commands to the lighting devices 33 and 34 using Zigbee.

Optionally, the HDMI module 11 may also transmit commands to the lighting devices 31 and 32 via the bridge 21 to synchronize the rendering of the dynamic light effects of all four lighting devices. For example, lighting devices 31 and 32 may be included in a Zigbee group and the HDMI module 11 may transmit trigger commands to this Zigbee group via the bridge 21. These trigger commands will cause the lighting devices 31 and 32 to render dynamic light effects previously received from HDMI module 11 using Bluetooth. This may be advantageous if synchronized light effect rendering is more important than low latency light effect rendering.

Figure 4:
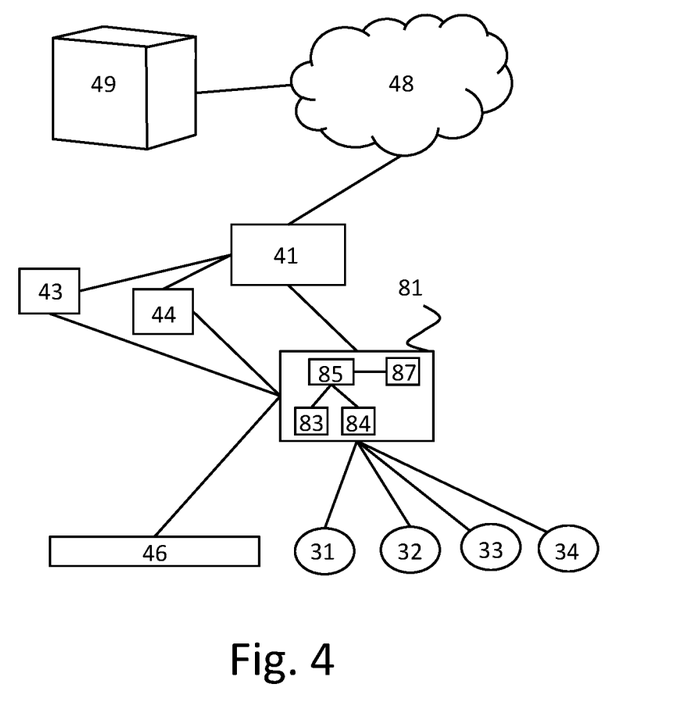
FIG. 4 is a block diagram of a second embodiment of the system.

FIG. 4 shows a second embodiment of the system for controlling a plurality of lighting devices included in an entertainment group: a light controller 81. In the embodiment of FIG. 4, light controller 81 combines the function of an HDMI module with the function of a bridge. Light controller 81 can control each of lighting devices 31-34 via a first communication protocol (e.g. Bluetooth) and/or via a second communication protocol (e.g. Zigbee). Light controller 81 is connected to a wireless LAN access point 41, e.g. via Wi-Fi or Ethernet.

Light controller 81 comprises a receiver 83, a transmitter 84, a processor 85, and memory 87. Processor 85 is configured to identify, via the receiver 83, the plurality of lighting devices included in the entertainment group, i.e. lighting devices 31-34, and assign a first subset of the lighting devices 31-34, e.g. lighting devices 31 and 32, to a first group and a second subset of the lighting devices 31-34, e.g. lighting devices 33 and 34, to a second group according to one or more grouping criteria. The first subset of lighting devices does not overlap completely with the second subset of lighting devices.

The processor 85 is configured to control, via the transmitter 84, using the first communication protocol, the first group of lighting devices to render a first subset of the dynamic light effects in the entertainment mode, and control, via the transmitter 84, using the second communication protocol, the second group of lighting devices to render a second subset of the dynamic light effects in the entertainment mode.

In the embodiment of light controller 81 shown in FIG. 4, light controller 81 comprises one processor 85. In an alternative embodiment, light controller 81 comprises multiple processors. The processor 85 of light controller 81 may be a general-purpose processor, e.g. ARM-based, or an application-specific processor. The processor 85 of light controller 81 may run a Unix-based operating system for example. The memory 87 may comprise one or more memory units. The memory 17 may comprise solid-state memory, for example.

The receiver 83 and the transmitter 84 may use one or more wired or wireless communication technologies such as Wi-Fi or Ethernet to communicate with the wireless LAN access point 41 and HDMI to communicate with the media rendering device 46 and with local media receivers 43 and 44, for example. In an alternative embodiment, multiple receivers and/or multiple transmitters are used instead of a single receiver and a single transmitter. In the embodiment shown in FIG. 4, a separate receiver and a separate transmitter are used. In an alternative embodiment, the receiver 83 and the transmitter 84 are combined into a transceiver. The light controller 81 may comprise other components typical for a light controller such as a power connector. The invention may be implemented using a computer program running on one or more processors.

Figure 5:
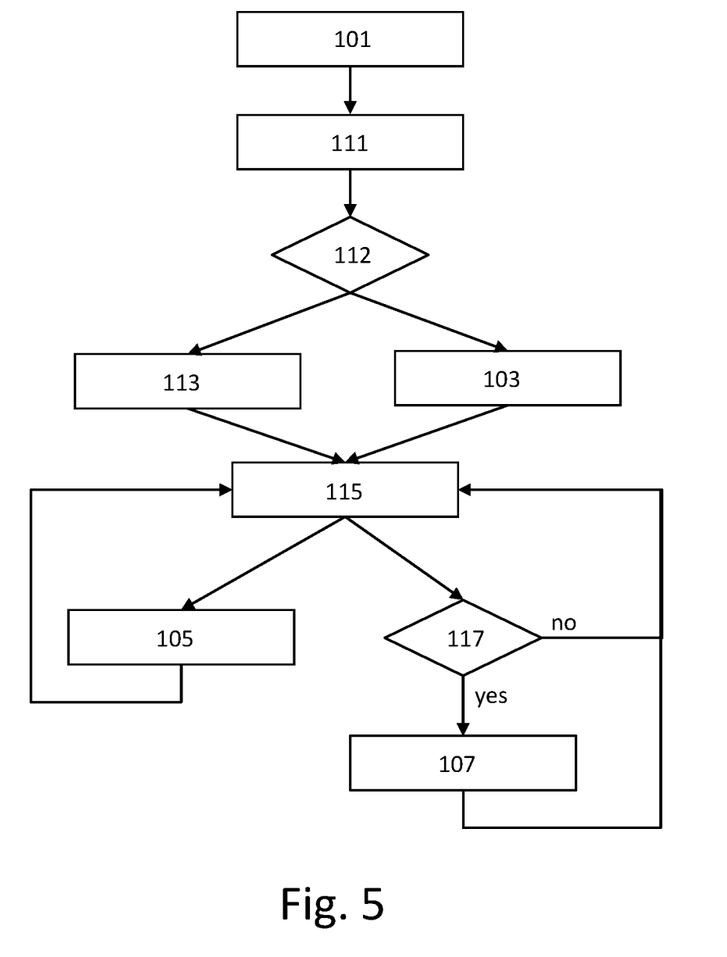
FIG. 5 is a flow diagram of a first embodiment of the method.

A first embodiment of the method of controlling a plurality of lighting devices included in an entertainment group is shown in FIG. 5. The plurality of lighting devices is controlled, in an entertainment mode, to render dynamic light effects corresponding to audio and/or video content being rendered on a media rendering device.

A step 101 comprises identifying the plurality of lighting devices included in the entertainment group. Step 101 may be performed upon starting the entertainment mode, for example. In the embodiment of FIG. 5, two different communication protocols can be used to control lighting devices. Lighting devices that are to be controlled using the first communication protocol are assigned to a first group. Lighting devices that are to be controlled using the second communication protocol are assigned to a second group. The first communication protocol may be Bluetooth and the second communication protocol may be Zigbee, for example.

In the embodiment of FIG. 5, the first group can comprise at most a first quantity of the plurality of lighting devices and the first communication protocol and/or a frequency spectrum used by the first communication protocol is more suitable for communicating dynamic light effects than the second communication protocol and/or a frequency spectrum used by the second communication protocol.

The suitability of the frequency spectrum of the communication protocols for communicating dynamic light effects typically depends on the busyness of the RF channels at the moment of intended streaming—which may impact Wi-Fi, Zigbee and Bluetooth communication in differing amounts. The maximum or preferred number of devices in the first group and/or in the second group may be based on the actual or expected capacity of the RF channels. Furthermore, a communication protocol may be considered more suitable for communicating dynamic light effects if it has a higher bandwidth, better synchronous control and/or a lower latency. As a first example, Zigbee unicast with hopping may need to be used to reach farther away lighting devices and this increases latency. In this case, it may preferred to use Bluetooth if these lighting devices are within range. As a second example, BLE is point to point and cannot perform synchronous control of multiple lighting devices, while Zigbee can. There may also be other aspects of a communication protocol that make it more suitable for communicating dynamic light effects.

One or more factors other than the communication protocol may also be considered when deciding which group is the preferred group. An example of such a factor is distance between the system (component) and lighting device(s). For example, the Hue bridge may be located far away from the lighting devices, so during streaming some commands have a chance to be dropped, thereby impacting user experience, while the HDMI module is located close to the TV and thus close to the lighting devices which are part of the entertainment group, i.e. used for the entertainment experience. In this case, the Bluetooth group may be preferred, because the HDMI module uses Bluetooth to communicate with the lighting devices.

The number of devices that may be assigned to a Bluetooth group may be limited to a maximum, as the Bluetooth specifications specify that seven is the maximum number of Bluetooth devices that can be connected at the same time. In practice, devices normally use a lower maximum number of Bluetooth devices that can be connected at the same time.

However, to circumvent the maximum number of simultaneous Bluetooth connections, Bluetooth Low Energy (BLE) advertisements or similar messages may be used in which the light commands are in the body of the advertisement (newer BLE versions extend the available space in the advertisements which could be used for this). In this case, it might be unnecessary to limit the size of the Bluetooth group.

Alternatively or additionally, the number of devices that may be assigned to a Zigbee group may be limited to a maximum. For example, Hue entertainment currently supports up to ten addressable Zigbee light sources in an entertainment group. Due to the constant stream of dynamic light effects in the entertainment mode, supporting more than ten Zigbee lighting devices, or more than ten groups of Zigbee lighting devices that behave the same, might cause performance issues.

Next, a step 111 comprises determining which one or more communication protocol(s) each lighting device supports. Then, a step 112 comprises determining whether to split the entertainment group into subgroups by determining whether the number of lighting devices identified in step 101 exceeds the first quantity and whether, based on the determination of step 111, one or more of the lighting devices do not support the first communication protocol.

If is determined in step 112 that the number of identified lighting devices does not exceed the first quantity and all lighting devices support the first communication protocol, a step 113 is performed. In step 113, all lighting devices identified in step 101 are assigned to the first group.

If not, a step 103 is performed after step 112. Step 103 comprises assigning a first subset of the plurality of lighting devices to the first group and a second subset of the plurality of lighting devices to the second group according to one or more grouping criteria. The first subset of lighting devices does not overlap completely with the second subset of lighting devices. In the embodiment of FIG. 5, first, the lighting devices that do not support the first communication protocol (and do support the second communication protocol) are assigned to the second group. If the number of lighting devices that do support the first communication protocol does not exceed the first quantity, all these lighting devices may be assigned to the first group.

Alternatively, a second grouping criterion may be applied and this may result in only some of the lighting devices that support the first communication protocol to be assigned to the first group even though the first group is not completely filled. In any case, the lighting devices assigned to the second group all support the second communication protocol.

A step 115 is performed after step 103 or step 113 has been performed. Step 115 comprises determining a set of dynamic light effects, e.g. based on an analysis of audio and/or video content or based on a light script. The set of dynamic light effects comprises a dynamic light effect for each lighting device. In the embodiment of FIG. 5, step 115 comprises analyzing screen or audio content to extract features important for light effect generation and generating light effects based on these features, e.g. using the algorithm implemented in the Hue Sync application.

Next, a step 105 and a step 117 are performed at least partly in parallel. In an alternative embodiment, step 117 is performed before or after step 105. Step 105 comprises controlling, using the first communication protocol, the first group of lighting devices to render a first subset of the dynamic light effects in the entertainment mode. The first subset of the set of dynamic light effects comprises the dynamic light effects determined for the lighting devices in the first group.

Step 117 comprises determining whether the second group comprises at least one lighting device. If not, then step 115 is repeated after step 105 has also been performed. If so, then a step 107 is performed. Step 107 comprises controlling, using the second communication protocol, the second group of lighting devices to render a second subset of the dynamic light effects in the entertainment mode. The second subset of the set of dynamic light effects comprises the dynamic light effects determined for the lighting devices in the second group.

In steps 105 and 107, light commands are transmitted from the system or respective system components to the assigned groups of lighting devices. If differences in latency are more important than low latency, the commands may be synchronized such that lighting devices receive and process the commands at the same time, unless both groups render different type of effects that require different level of synchronicity with the content—e.g. special effects versus ambiance. Step 115 is repeated after steps 105 and 107 have been performed, after which the method proceeds as shown in FIG. 5 for the next set of dynamic light effects.

Figure 6:
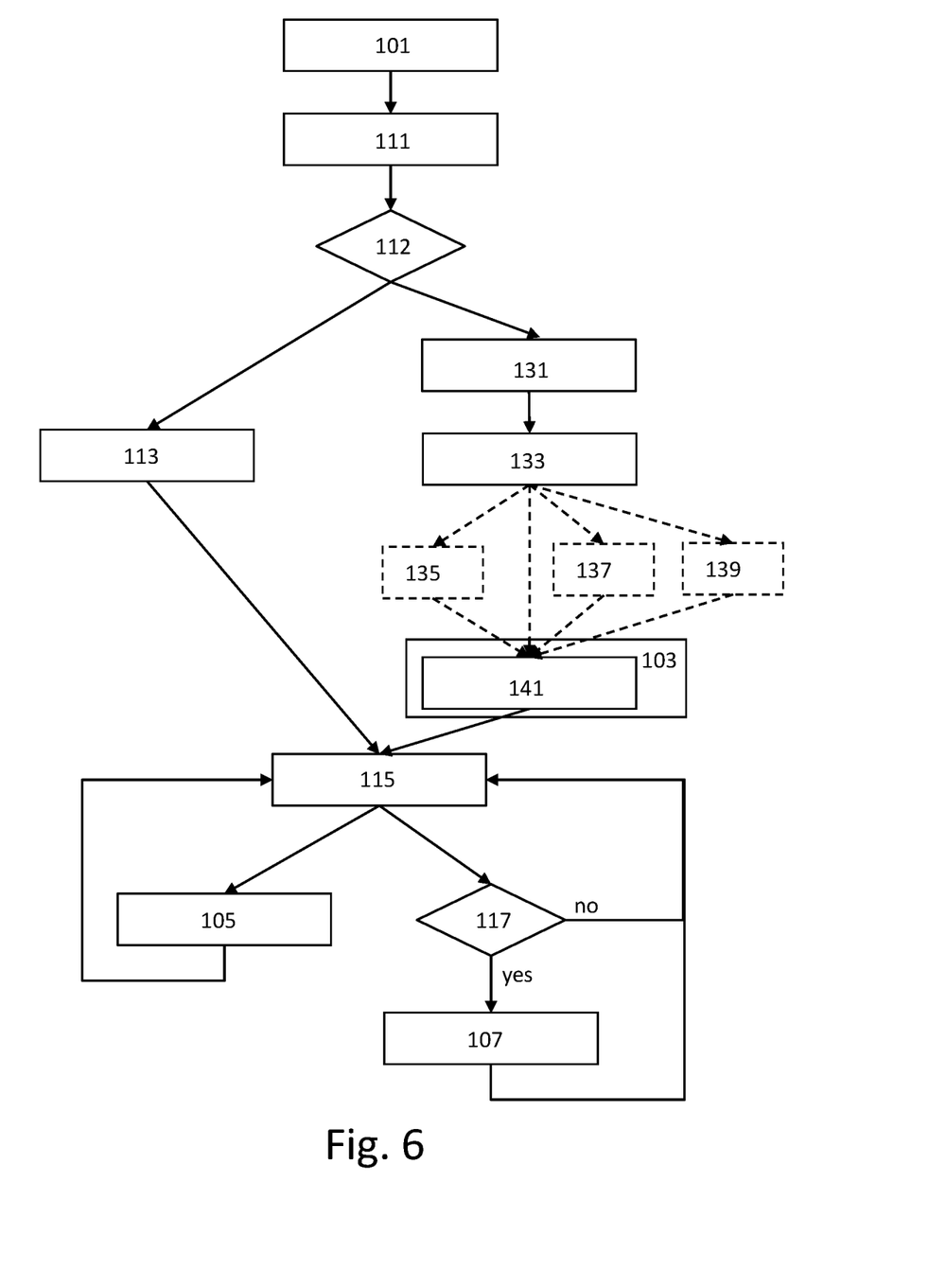
FIG. 6 is a flow diagram of a second embodiment of the method.

A second embodiment of the method of controlling a plurality of lighting devices included in an entertainment group is shown in FIG. 6. The plurality of lighting devices is controlled, in an entertainment mode, to render dynamic light effects corresponding to audio and/or video content being rendered on a media rendering device. The embodiment of FIG. 6 is an extension of the embodiment of FIG. 5.

In the embodiment of FIG. 6, if it is determined in step 112 that the number of lighting devices identified in step 101 exceeds the first quantity or one or more of the lighting devices does not support the first communication protocol, a step 131 is performed. Step 131 comprises determining a type of the audio and/or video content. Next, a step 133 comprises selecting the one or more grouping criteria from a set of grouping criteria. In the embodiment of FIG. 6, the grouping criteria are:

Communication protocol(s) supported by lighting device;
Distance between a lighting device and the system (the system in general or a specific component);
Distances between a lighting device and other lighting devices;
Differences between dynamic light effects to be rendered by a lighting device and dynamic light effects to be rendered by other lighting devices.

In step 133, one or more of the grouping criteria may be selected based on the type of the audio and/or video content determined in step 131. For example, if the content being reproduced on the media rendering device is an action movie, i.e. is very dynamic, the determined light effects will be very dynamic as well and a low latency and low variation in latency will therefore be important. In this case, criterion a) and one or more of criteria b-d) may be selected. If the content is not very dynamic, only criterion a) may be selected, for example. Depending on which one or more grouping criteria has been selected, one or more of steps 135, 137, and 139 may be performed next.

Step 135 comprises determining distances between the system and each of the plurality of lighting devices. The distances may be determined by determining a number of hops between the system and each of the plurality of lighting devices and/or based on the signal quality (e.g. RSSI) of signals received by the system from the lighting devices. Step 137 comprises determining the distance between each lighting device and each further lighting device.

Step 139 comprises determining differences between the dynamic light effects before the content is rendered on the media rendering device. Step 139 may be performed, for example, if the dynamic light effects are determined from a light script and not determined based on real-time analysis of audio and/or video content. The script could be streamed or preloaded to a bridge and/or an HDMI module, for example.

Next, step 103 comprises assigning a first subset of the plurality of lighting devices to the first group and a second subset of the plurality of lighting devices to the second group according to the selected one or more grouping criteria. For example, if the content being reproduced on the media rendering device is an action movie, the lighting devices may first be grouped based on whether they support the first communication protocol (criterion a) and if the lighting devices that support the first communication protocol exceed the maximum (i.e. first quantity), then grouping criteria b), c) or d) may be applied.

If the content is not very dynamic, the lighting devices may first be grouped based on whether they support the first communication protocol (criterion a) and the lighting devices that support both the first communication protocol and the second communication protocol may then be assigned arbitrarily to one of the two groups, for example.

In the embodiment of FIG. 6, step 103 is implemented by a step 141. If criterion b) was selected in step 133 and step 135 was performed, the lighting devices that support both the first communication protocol and the second communication protocol are assigned to the first and second groups in step 141 based on the distances between the system and each of the plurality of lighting devices, as determined in step 135.

Figure 7:
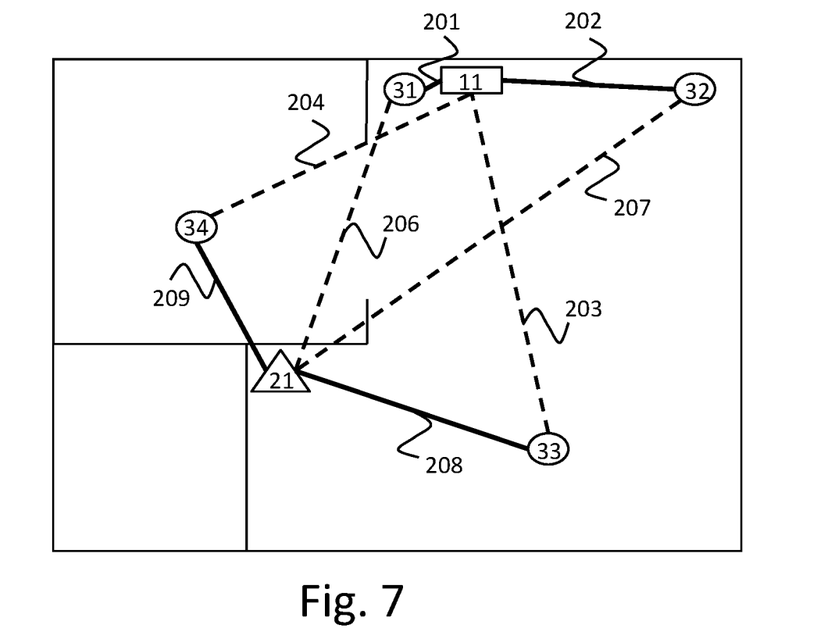
FIG. 7 shows representations of distances between the system and the lighting devices in the space of FIG. 2.

FIG. 7 shows representations of distances between the system and the lighting devices in the space of FIG. 2. In the example of FIG. 7, the distances are the shortest distances between the system and each lighting device, e.g. measured in meters. In the example of FIG. 7, the system comprises two components, an HDMI module 11 and a bridge 21, and therefore the distance between each component of the system and each lighting device is represented.

In the example of FIG. 7, the HDMI module 11 controls lighting devices using the first communication protocol and the bridge 21 controls lighting devices using the second communication protocol. Thus, each system component corresponds to a group. One approach for of assigning the lighting devices 31-34 of FIG. 7 to groups is to assign each lighting device to the closest system component.

In the example of FIG. 7, the distances 201-204 between HDMI module 11 and lighting devices 31-34 are 0.3 m, 2.9 m, 5.9 m, and 4.9 m, respectively, and the distances 206-209 between bridge 21 and lighting devices 31-34 are 4.9 m, 8 m, 4.2 m, and 2.5 m, respectively. If lighting devices 31-34 all support both communication protocols, lighting devices 31 and 32 would be assigned to the HDMI module 11 and therefore to the first group and lighting devices 33 and 34 would be assigned to the bridge 21 and therefore to the second group.

If criterion c) was selected in step 133 and step 137 was performed, the lighting devices that support both the first communication protocol and the second communication protocol are assigned to the first and second groups in step 141 based on the distances determined in step 137 such that the first group only comprises lighting devices of which a distance to at least one other lighting device of the first group does not exceed a threshold and the second group only comprises lighting devices of which a distance to any one of the lighting devices of the first group exceeds the threshold.

Figure 8:
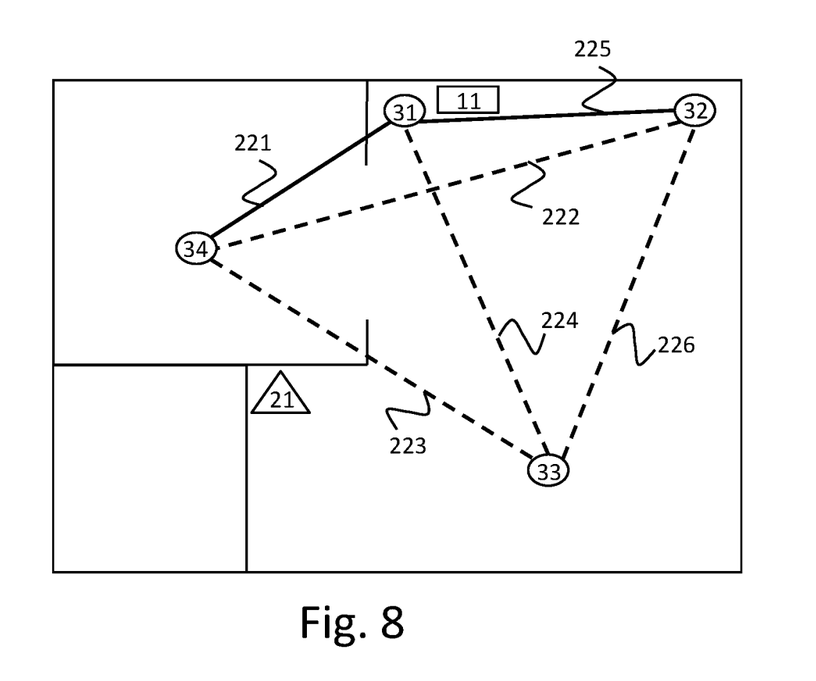
FIG. 8 shows representations of distances between the lighting devices in the space of FIG. 2.

FIG. 8 shows representations of distances between the lighting devices in the space of FIG. 2. In the example of FIG. 8, the distances are the shortest distances between each lighting device and each other lighting device, e.g. measured in meters. If lighting devices 31-34 all support both communication protocols, lighting devices 31, 32, and 34 would be assigned to one group and lighting device 33 would be assigned to the other group.

In the example of FIG. 8, the threshold is not predetermined and a threshold between 4.3 m and 6.1 m is used. The distances between lighting device 31 and lighting devices 32, 33, and 34, i.e. distances 225, 224 and 221, are 4.3 m, 6.1 m, and 3.6 m, respectively. The distances between lighting device 32 and lighting devices 31, 33, and 34, i.e. distances 225, 226 and 222, are 4.3 m, 6.1 m, and 8.1 m, respectively. The distances between lighting device 33 and lighting devices 31, 32 and 34, i.e. distances 224, 226 and 223, are 6.1 m, 6.1 m, and 6.4 m, respectively. The distances between lighting device 34 and lighting devices 31, 32, and 33, i.e. distances 221, 222 and 223, are 3.6 m, 8.1 m, and 6.4 m, respectively. The shortest distance between lighting device 33 and any of lighting devices 31, 32 and 34 is 6.1 m, while distance 225 between lighting devices 31 and 32 is 4.3 m and distance 221 between lighting devices 31 and 34 is 3.6 m.

If criterion d) was selected in step 133 and step 139 was performed, the lighting devices that support both the first communication protocol and the second communication protocol and render similar dynamic light effects, as determined in step 139, are assigned to the same group in step 141. The other steps represented in FIG. 6 are the same as described in relation to FIG. 5.

In the examples of FIGS. 7 and 8, physical distances have been determined and are used for grouping the lighting devices. However, it may be preferable to determine the distances based on signal quality, as throughput and latency often depends more on signal quality than on physical distance and signal quality may not be directly proportional to distance (e.g. due to walls).

Figure 9:
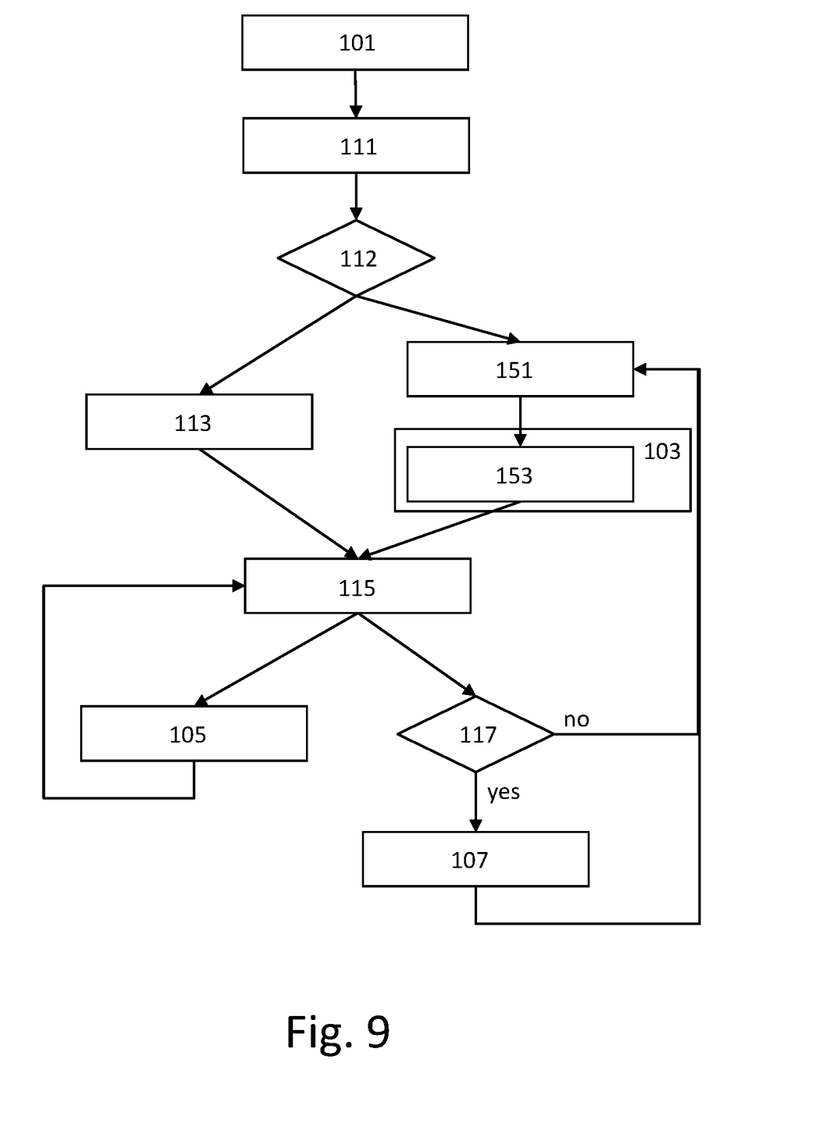
FIG. 9 is a flow diagram of a third embodiment of the method.

A third embodiment of the method of controlling a plurality of lighting devices included in an entertainment group is shown in FIG. 9. The plurality of lighting devices is controlled, in an entertainment mode, to render dynamic light effects corresponding to audio and/or video content being rendered on a media rendering device. The embodiment of FIG. 9 is an extension of the embodiment of FIG. 5.

In the embodiment of FIG. 9, if it is determined in step 112 that the number of lighting devices identified in step 101 exceeds the first quantity or one or more of the lighting devices does not support the first communication protocol, a step 151 is performed.

Step 151 comprises determining differences between the dynamic light effects while the content is rendered on the media rendering device. For example, the differences in how dynamic and how synchronous the rendered effects need to be may be determined. Step 151 may be performed, for example, if the dynamic light effects are determined based on real-time analysis of audio and/or video content.

Step 103 is performed after step 151. Step 103 comprises assigning a first subset of the plurality of lighting devices to the first group and a second subset of the plurality of lighting devices to the second group according to the selected one or more grouping criteria. In the embodiment of FIG. 9, step 103 is implemented by a step 153. In step 153, lighting devices that render similar dynamic light effects, as determined in step 151, are assigned to the same group.

Step 151 is repeated after step 107 has been performed. Thus, one or more of the lighting devices may be reassigned from the first group to the second group or from the second group to the first group while the entertainment mode is active. To implement this, all lighting devices in the entertainment group may be classified into three static subgroups: 1) lighting devices that should only be controlled using the first communication protocol (e.g. due to various reasons like not supporting the second communication protocol or being too far from the device that uses the second communication protocol), 2) lighting devices that should only be controlled using the second communication protocol, and 3) lighting devices that may be controlled using both communication protocols, e.g. by two devices if each communication protocol is used by a different device. In this implementation, step 151 comprises dynamically redistributing the third static subgroup to the two dynamic subgroups depending on the type of light effects that needs to be rendered.

If the light effects are determined based on a light script, this redistribution of lighting devices into two groups depending on the type of light effects that needs to be rendered can be done ahead of time, as the script describes all light effects and when they will be rendered. This has been described in relation to step 139 of FIG. 6.

The other steps represented in FIG. 9 are the same as described in relation to FIG. 5. Thus, in the embodiment of FIG. 9, the assignment of lighting devices to the groups is dynamic and based on the type of light effects that need to be rendered.

In the embodiments of FIGS. 5, 6 and 9, the two groups do not overlap at all. In an alternative embodiment, the two groups partially overlap and for each lighting device in two groups, the system decides on the fly which group to use to control this lighting device. For example, if lighting device 32 of FIG. 1 is assigned two groups, lighting device 32 may be controlled via group 1 (by HDMI module 11) for gaming content/mode control and via group 2 (by bridge 21) for audio content/mode control or lighting 32 may be controlled via group 1 or group 2 depending on how busy the RF channels are at a certain moment.

This is typically faster and/or more flexible than having to reassign nodes from one group to the other and is also beneficial if certain beneficial dedicated commands are only available via one of the communication protocols. For instance, if BLE would have a dedicated command to mimic an explosion and this is not available on Zigbee, then it would be beneficial to send the explosion-command via BLE even if for other entertainment light control to the same lighting device, transmission via Zigbee might be preferred.

In the latter example, the lighting device could also be temporarily reassigned to the Zigbee group, but very frequent reassignments might result in an interruption of the flow of light commands, leading to hiccups or longer periods without new light effects.

In the embodiments of FIGS. 5, 6 and 9, one or more of the plurality of lighting devices only support the second communication protocol, e.g. Zigbee, and the other ones of the plurality of lighting devices support both the first and second communication protocols, e.g. Bluetooth and Zigbee. In an alternative embodiment, all lighting devices support both the first and second communication protocols and step 111 is omitted. In this alternative embodiment, step 112 need only comprise determining whether the number of lighting devices identified in step 101 exceeds the first quantity. In the embodiments of FIGS. 5, 6 and 9, only two (main) groups are used. In an alternative embodiment, more than two (main) groups are used.

Figure 10:
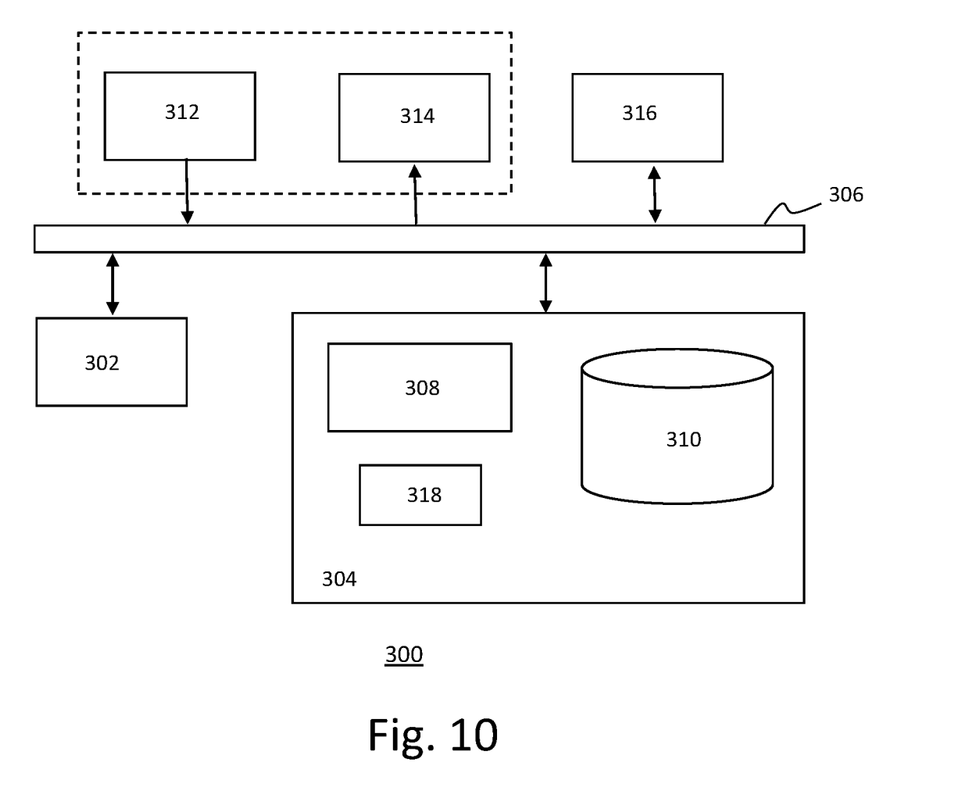
FIG. 10 is a block diagram of an exemplary data processing system for performing the method of the invention.

FIG. 10 depicts a block diagram illustrating an exemplary data processing system that may perform the method as described with reference to FIGS. 5, 6 and 9.

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 10) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a plurality of lighting devices included in an entertainment group, said plurality of lighting devices being controlled, in an entertainment mode, to render dynamic light effects corresponding to audio and/or video content being rendered on a media rendering device, said system comprising:
   at least one input interface;
   at least one output interface;
   at least one processor configured to:
      identify, via said at least one input interface, said plurality of lighting devices included in said entertainment group,
      assign a first subset of said plurality of lighting devices to a first group and a second subset of said plurality of lighting devices to a second group according to one or more grouping criteria, said first subset of lighting devices not overlapping completely with said second subset of lighting devices,
      control, via said at least one output interface, using a first communication protocol, said first group of lighting devices to render a first subset of said dynamic light effects in said entertainment mode, and
      control, via said at least one output interface, using a second communication protocol, said second group of lighting devices to render a second subset of said dynamic light effects in said entertainment mode,
   wherein said at least one processor is configured to determine distances between said system and each of said plurality of lighting devices and assign said plurality of lighting devices to said groups based on said distances.

2. A system as claimed in claim 1, wherein at least one of said first and second groups has a maximum of lighting devices which can be assigned to said group.

3. A system as claimed in claim 2, wherein said first group can comprise at most a first quantity of said plurality of lighting devices, said first communication protocol and/or a frequency spectrum used by said first communication protocol is more suitable for communicating dynamic light effects than said second communication protocol and/or a frequency spectrum used by said second communication protocol, and said at least one processor is configured to assign said first quantity of said plurality of lighting devices to said first group.

4. A system as claimed in claim 1, wherein said at least one processor is configured to determine said distances by determining a number of hops between said system and each of said plurality of lighting devices.

5. A system as claimed in claim 1, wherein said first subset only comprises lighting devices of which a distance to at least one other lighting device of said first subset does not exceed a threshold and said second subset of lighting devices only comprises lighting devices of which a distance to any one of said lighting devices of said first subset exceeds said threshold.

6. A system as claimed in claim 1, wherein said first subset of lighting devices comprises at least one lighting device which does not support said second communication protocol and/or said second subset of lighting devices comprises at least one lighting device which does not support said first communication protocol.

7. A system as claimed in claim 1, wherein said second subset of lighting devices comprises at least two lighting devices which can be controlled with a single command.

8. A system as claimed in claim 1, wherein said at least one processor is configured to select at least one of said one or more grouping criteria from a set of grouping criteria based on a type of said audio and/or video content.

9. A system as claimed in claim 1, wherein said at least one processor is configured to reassign, while said entertainment mode is active and according to said one or more grouping criteria, at least one of said first subset of lighting devices from said first group to said second group and/or at least one of said second subset of lighting devices from said second group to said first group.

10. A system as claimed in claim 1, wherein said at least one processor is configured to determine differences between said dynamic light effects and assign said plurality of lighting devices to said groups based on said differences.

11. A system as claimed in claim 1, wherein said at least one processor is configured to control either said first group of lighting devices or said second group of lighting devices via a bridge.

12. A system as claimed in claim 1, wherein said at least one processor is configured to control said lighting devices from both said first and second groups via one of said communication protocols when said entertainment mode is not active.

13. A method of controlling a plurality of lighting devices included in an entertainment group, said plurality of lighting devices being controlled, in an entertainment mode, to render dynamic light effects corresponding to audio and/or video content being rendered on a media rendering device, said method comprising:
   identifying said plurality of lighting devices included in said entertainment group;
   determining distances between said system and each of said plurality of lighting devices;
   assigning a first subset of said plurality of lighting devices to a first group and a second subset of said plurality of lighting devices to a second group according to one or more grouping criteria, said first subset of lighting devices not overlapping completely with said second subset of lighting devices, wherein said plurality of lighting devices are assigned to said groups based on said distances;
   controlling, using a first communication protocol, said first group of lighting devices to render a first subset of said dynamic light effects in said entertainment mode; and
   controlling, using a second communication protocol, said second group of lighting devices to render a second subset of said dynamic light effects in said entertainment mode.

14. A computer program or suite of computer programs comprising at least one software code portion or a computer program product storing at least one software code portion, the software code portion, when run on a computer system, cause the computer to carry out the method of claim 13.

* * * * *